C. R. WILSON.
SELF FEEDER FOR THRESHERS.
APPLICATION FILED MAR. 21, 1912.
1,048,622.
Patented Dec. 31, 1912.
2 SHEETS—SHEET 1.
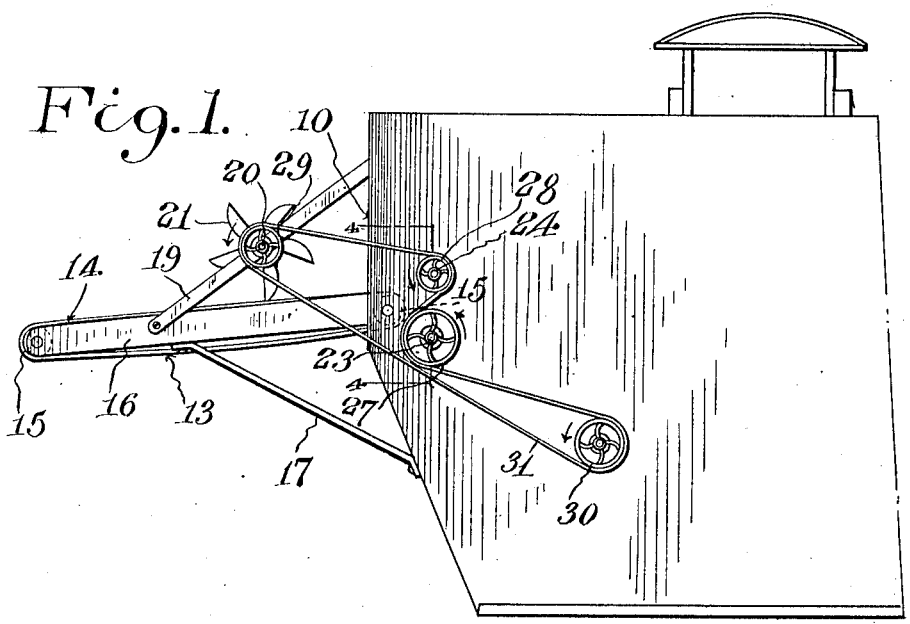
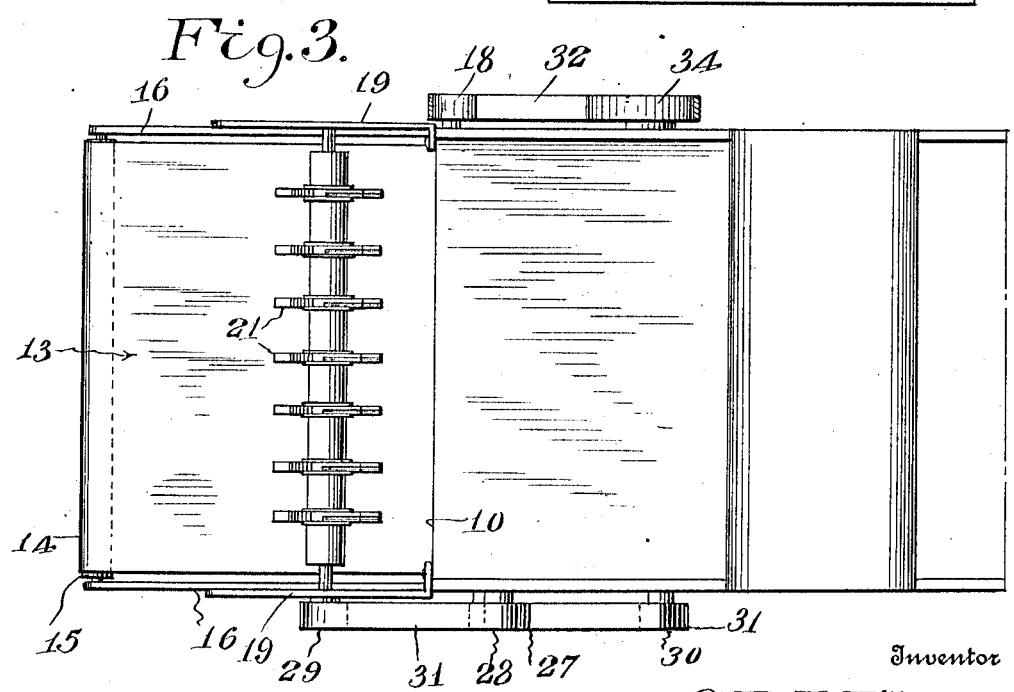
Witnesses:
J. P. Mabler
Francis Boyle
Inventor
C. R. Wilson.
By
Attorney C. R. WILSON.
SELF FEEDER FOR THRESHERS.
APPLICATION FILED MAR. 21, 1912.
1,048,622.
Patented Dec. 31, 1912.
2 SHEETS—SHEET 2.
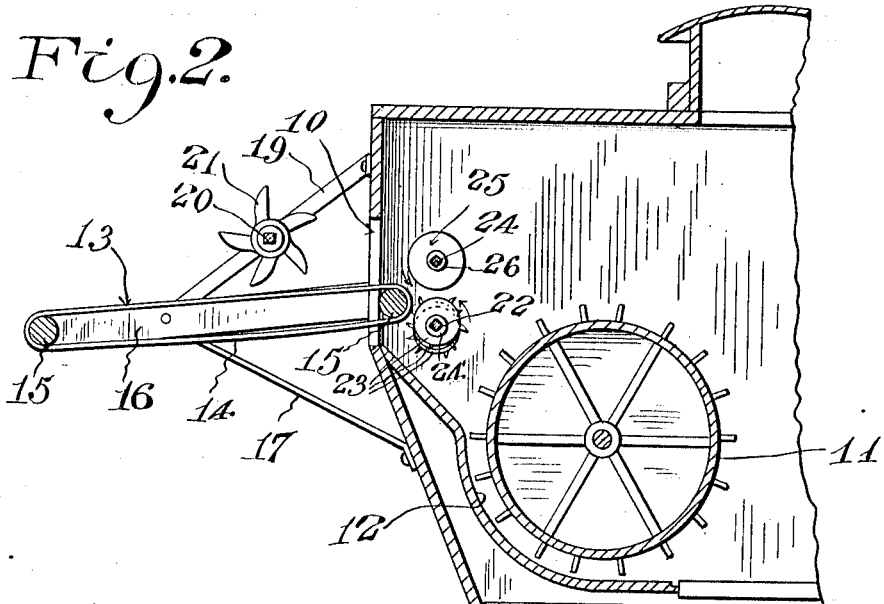
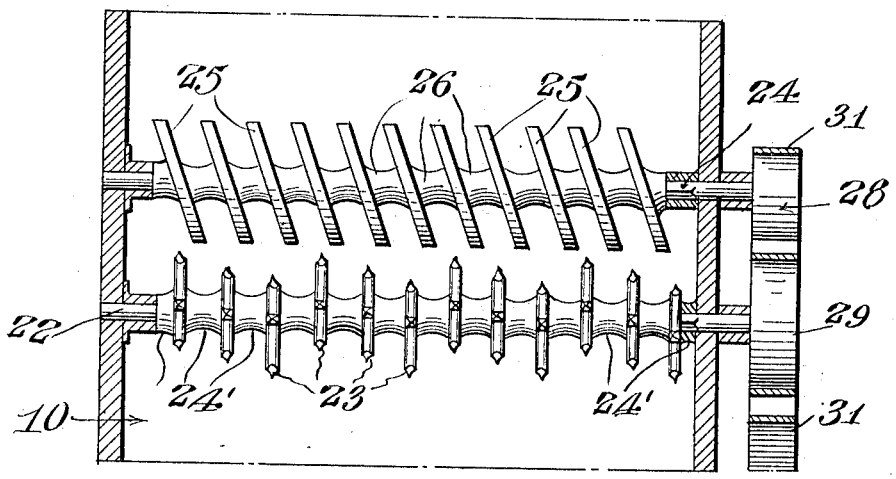
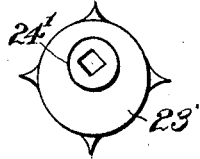
Witnesses:
J. P. Mahler.
Francis Boyle.
Inventor
C. R. Wilson.
By Chandler & Chandler
Attorney

UNITED STATES PATENT OFFICE.

CHANCE R. WILSON, OF DONOVAN, ILLINOIS.

SELF-FEEDER FOR THRESHERS.

1,048,622.

Specification of Letters Patent. Patented Dec. 31, 1912.

Application filed March 21, 1912. Serial No. 685,256.

*To all whom it may concern:*

Be it known that I, CHANCE R. WILSON, a citizen of the United States, residing at Donovan, in the county of Iroquois, State of Illinois, have invented certain new and useful Improvements in Self-Feeders for Threshers; and I do hereby declare the following to be a full, clear, and exact description of the invention, such as will enable others skilled in the art to which it appertains to make and use the same.

This invention relates to automatic feeders for threshing machines and has for an object to provide novel means for retarding the straw after the band cutter has operated on the bundles, in combination with novel means for combing the straw from the retarding means and feeding the straw to the thresher cylinder.

With the above object in view the invention consists of certain novel details of construction and combination of parts hereinafter fully described and claimed, it being understood that various modifications may be made in the minor details of construction within the scope of the appended claim.

In the accompanying drawings forming part of this specification:—Figure 1 is a side elevation of the intake end of a threshing machine equipped with my invention. Fig. 2 is a longitudinal sectional view through the parts shown in Fig. 1. Fig. 3 is a plan view of the parts shown in Fig. 1. Fig. 4 is a cross sectional view taken on the line 4—4 Fig. 1. Fig. 5 is an end view of one of the retarders.

Referring now to the drawings in which like characters of reference designate similar parts, 10 designates in general the intake end of an ordinary threshing machine. The threshing cylinder 11 is revolubly mounted above the concaves 12 and feeds the straw thereover to the riddles as usual in devices of this character.

The feeding mechanism comprising the subject-matter of this invention consists of an endless carrier 13 comprising an apron 14 trained over rollers 15 which are connected by parallel side bars 16, the latter being anchored to the thresher casing by inclined braces 17. The upper roller is equipped with a driving pulley 18. This carrier serves to feed the bundles of grain underneath the band cutter and then to the retarding and spreading devices.

Journaled in inclined braces 19 which are secured to the harvester casing and endless carrier side bars, is a shaft 20 upon which are fixed a plurality of band cutter wheels 21, these wheels being of the usual kind and operating to sever the binding bands of the grain bundles as the latter travel along the endless carrier.

Journaled in the thresher casing are the cylindrical ends of a shaft 22 which is substantially square in cross section, and mounted on this shaft are a plurality of saws 23, the saws having eccentrically disposed hubs 24 which are provided with square bores to receive the shaft. The saws are thus eccentrically mounted on the shaft and have their teeth pointing in the direction of the band cutter whereby the saws serve to retard the passage of the straw from the discharge end of the endless carrier. The retarding device just described is positioned at the discharge end of the endless carrier and below said discharge end whereby the straw is caused to accumulate to a certain extent upon said discharge end.

Journaled in the thresher casing above the thresher cylinder and adjacent to the discharge end of said endless carrier are the cylindrical ends of a shaft 24 which is substantially square in cross section. This shaft is equipped with a plurality of disks 25 the hubs 26 of which are provided with square bores to receive the shaft. The disks are arranged parallel with each other and all intersect the shaft at an angle of about sixty degrees. These disks by virtue of their inclination to the shaft operate to spread the accumulated straw and comb the same from the retarding device above described, the straw being then fed by the disks to the threshing cylinder in a loose and uniformly spread out mass.

The shaft 22 of the retarding device is equipped with a driving pulley 27 and the shaft 24 of the spreading and combing device is equipped with a driving pulley 28. The shaft 20 of the band cutter is equipped with a driving pulley 29, and the thresher cylinder is equipped with the usual pulley 30. An endless belt 31 is trained over the four pulleys above described as shown in Fig. 1 and is actuated in the direction of the arrow heads shown in this figure to rotate the band cutter, the retarding device, and the spreading and combing device in the proper direction to perform their respective functions. The endless carrier is driven by a belt 32 which is trained over the driving pulley 18 above mentioned and a driving pulley 34 carried by the threshing cylinder shaft as shown.

What is claimed, is:—

In a threshing machine, an endless carrier, a revoluble band cutter above said carrier, a revoluble retarding device below the discharge end of said endless carrier including a shaft and a plurality of eccentrically mounted circular saws, said retarding device serving to obstruct the passage of straw from said elevator and cause the accumulation of the straw upon said elevator, and a revoluble spreading and combing device above the discharge end of said elevator including a shaft and a plurality of disks thereon arranged parallel with each other and intersecting the shaft at an angle of about sixty degrees, said disks serving to spread accumulated straw on said retarding device and comb the same therefrom in a loose uniformly spread out mass.

In testimony whereof, I affix my signature, in presence of two witnesses.

CHANCE R. WILSON.

Witnesses:
  J. W. HUTCHISON,
  E. B. NORDWAHL.

---

Copies of this patent may be obtained for five cents each, by addressing the " Commissioner of Patents, Washington, D. C."